(12) United States Patent
Khudysh et al.

(10) Patent No.: US 10,148,224 B2
(45) Date of Patent: Dec. 4, 2018

(54) COMBINED CONCENTRATOR PHOTOVOLTAIC INSTALLATION

(71) Applicant: OBSHCHESTVO S OGRANICHENNOJ OTVETSTVENNOSTYU "SOLEKS-R", Ryazan (RU)

(72) Inventors: Aleksandr Ilich Khudysh, Ryazan Ryazanskaya obl. (RU); Evgenii Valerevich Oshkin, Ryazan Ryazanskaya obl. (RU); Aleksandr Viktorovich Ivanov, Ryazan Ryazanskaya obl. (RU)

(73) Assignee: OBSHCHESTVO S OGRANICHENNOJ OTVETSTVENNOSTYU "SOLEKS-R", Ryazan (RU)

(*) Notice: Subject to any disclaimer, the term of this patent is extended or adjusted under 35 U.S.C. 154(b) by 0 days.

(21) Appl. No.: 15/661,388

(22) Filed: Jul. 27, 2017

(65) Prior Publication Data
US 2017/0353154 A1 Dec. 7, 2017

Related U.S. Application Data

(63) Continuation of application No. PCT/RU2016/000072, filed on Feb. 15, 2016.

(30) Foreign Application Priority Data

Jan. 29, 2015 (RU) ............................. 2015102918

(51) Int. Cl.
*H02S 40/44* (2014.01)
*H02S 10/30* (2014.01)
(Continued)

(52) U.S. Cl.
CPC ............. *H02S 40/44* (2014.12); *F24S 10/25* (2018.05); *H02S 10/30* (2014.12); *H02S 20/32* (2014.12);
(Continued)

(58) Field of Classification Search
CPC ........... H02S 10/30; H02S 10/44; H02S 10/32
See application file for complete search history.

(56) References Cited

U.S. PATENT DOCUMENTS

| 9,353,973 B2 | 5/2016 | Almogy et al. |
| 2013/0008487 A1 | 1/2013 | Cheng et al. |
| 2015/0326176 A1* | 11/2015 | Austin .................. H02S 40/34 136/246 |

FOREIGN PATENT DOCUMENTS

| RU | 2252371 C2 | 5/2005 |
| RU | 2382953 C1 | 2/2010 |

OTHER PUBLICATIONS

International Search Report with regard to PCT/RU2016/000072 dated May 26, 2016.
(Continued)

*Primary Examiner* — Tae-Sik Kang
(74) *Attorney, Agent, or Firm* — BCF LLP

(57) ABSTRACT

A solar power installation having cooled bifacial photovoltaic solar modules for converting solar energy into electrical and thermal energy. The installation comprises a bifacial photovoltaic (PV) module having a liquid cooling system, a panel including bifacial PV cells, and a flat mirror concentrator for concentrating light on the panel. The installation also comprises a heat exchanger; a solar tracking system; and a parabolic mirror concentrator. The liquid cooling system has a closed circulation circuit. A first circuit section has a passage located over surfaces of the panel with the bifacial PV cells for cooling the surfaces of the panel. A second circuit section is located such that coolant passes (Continued)

through a focus of the parabolic mirror concentrator for additional heating of the coolant passing therein prior to entering the heat exchanger.

4 Claims, 4 Drawing Sheets

(51) Int. Cl.
*H02S 20/32* (2014.01)
*H02S 30/10* (2014.01)
*H02S 40/22* (2014.01)
*H02S 40/42* (2014.01)
*F24S 10/25* (2018.01)
*F24S 90/00* (2018.01)
*F24S 23/74* (2018.01)
*F24S 20/20* (2018.01)

(52) U.S. Cl.
CPC .............. *H02S 30/10* (2014.12); *H02S 40/22* (2014.12); *H02S 40/425* (2014.12); *F24S 20/20* (2018.05); *F24S 23/74* (2018.05); *F24S 90/00* (2018.05); *Y02E 10/40* (2013.01); *Y02E 10/60* (2013.01)

(56) References Cited

OTHER PUBLICATIONS

Final Report, Solar Cogeneration of Electricity and Hot Water at DoD Installations, ESTCP Project EW-201248, May 2014, pp. 1-79.

* cited by examiner

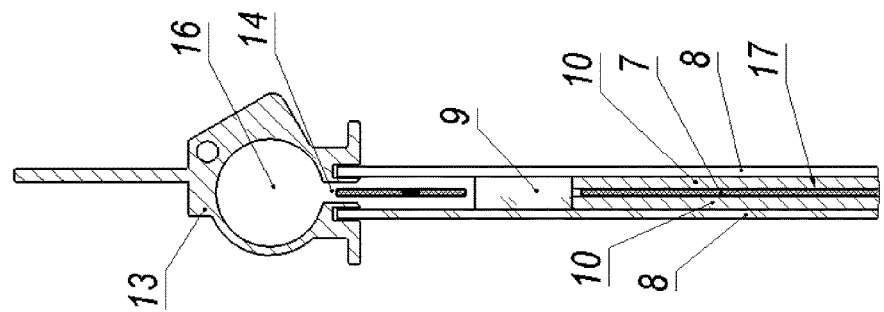
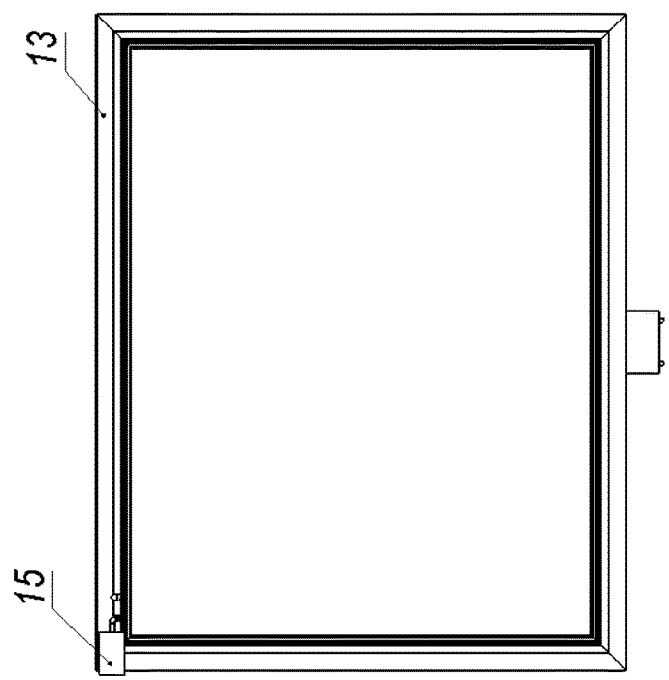
Figure 4B
Figure 4A

COMBINED CONCENTRATOR PHOTOVOLTAIC INSTALLATION

CROSS-REFERENCE

The present application claims convention priority to Russian Utility Patent Application No. 2015102918, filed on Jan. 29, 2015, entitled "КОМ Б И НИ РОВАННАЯ КОНЦЕНТРАТОРНАЯ ФОТОЭЛЕКТРИЧЕСКАЯ УСТАНОВКА". This application is incorporated by reference herein in its entirety. The present application is a continuation of International Patent Application no. PCT/RU2016/000072, filed on Feb. 15, 2016 entitled "COMBINED CONCENTRATOR PHOTOVOLTAIC INSTALLATION". This application is incorporated by reference herein in its entirety.

FIELD

Non-limiting embodiments of the present technology relate to solar engineering in general, and in particular, to combined photovoltaic (PV) thermal concentrator solar power installations (SPI) with a cooled bifacial PV modules for converting solar energy into electrical and thermal energy.

BACKGROUND

The temperature of the PV module, which is part of the SPI with a concentration of solar energy less than 10 000 W/m2, in the absence of artificial PV module cooling, can accurately be described by the formula:

$$Tm = t + 1{,}25 G (TNOCT - 20) \quad (1),$$

where t— ambient temperature (° C.), TNOCT— normal operating temperature of PV module (° C.), G— solar concentration ratio.

There are known concentrator SPI based on bifacial PV modules with solar energy concentrator built on flat reflecting plates: RU Patent No2406043 and Super TRAXLE 5× concentrator (http://www.solar-trackers.com/). In these SPIs, bifacial PV modules are installed in the focal plane of a flat concentrator, from which it receives uniform sunlight with a concentration ratio G≥3. Heat removal from the PV module is carried out by natural cooling.

The disadvantage of these SPIs is a significant decrease in the output power due to strong heating of the PV module. According to the formula (1), the design temperature Tm at an ambient temperature of +30° C. will be about 100° C. As a result, there will be a decrease of power output by more than 30% and exceed the maximum guaranteed operating temperature in +85° C. for the standard PV modules.

A known SunPower C7 Tracker is a concentrator SPI with the value of solar concentration ratio of G=7 (http://us.sunpower.com/). To remove the heat on the back side of the solar PV cells, a copper foil is soldered in a form of collector lanes, and the copper foil is placed on a metal radiator.

The disadvantages of C7 Tracker are:
  lower power drop from ambient temperature than in the previous two SPIs, but still insufficient to provide high parameters at ambient temperature above +40° C.;
  bifacial PV modules operate as single-sided ones, which reduces the total efficiency;
  mirror concentrators have cylindrical shape and are directed bulge downwards, which leads to an intense accumulation of dust and moisture in them.

Russian Patent 2,382,953 discloses a combined solar power station. Bifacial PV cells are set in a closed housing with transparent windows, filled with coolant. This closed housing fits in a second housing, in which the heat carrier circulates through the heat transfer loop. PV cells receive the sunlight on both sides from the concentrator. The heat from the surface of the PV cells is taken away by the coolant and proceeds, in the circulation circuit, to the consumer.

The SPI disclosed in RU 2,382,953 has the following disadvantages:
  Using of parabolic concentrator leads to the need to have the PV cells of small size, so that they are in the focus of a parabolic cylinder, otherwise, the efficiency of the installation is drastically reduced.
  There is a contradiction in the design of the SPI as disclosed in RU 2382953. In order to increase the efficiency of operation, the temperature of the PV cells should be as low as possible and not exceed the boundary upper operating temperature of PC cells. For effective operation of the heat circuit, it is desirable to have PV cells temperature as high as possible.
  The design of the SPI disclosed in RU 2,382,953 is very complex and expensive.

SUMMARY

The technical effect of at least one embodiment of the present technology as disclosed herein is an increase in the amount of produced electrical energy, achieved at least partially by reducing thermal losses resulting from a direct conversion of solar energy incident on cooled bifacial PV modules from flat mirror concentrators, as well as by using the thermal energy taken away from the bifacial PV module and obtained as a result of additional heating of a coolant in a parabolic concentrator.

In accordance with at least one embodiment, a solar power installation as described herein comprises a bifacial photovoltaic (PV) module having: a liquid cooling system, and a panel including: bifacial PV cells and intermediate panel sections. The solar power installation further comprises a flat mirror concentrator for concentrating light on the panel; a heat exchanger with a fluid circulation system in fluid communication with the liquid cooling system; non-return valves in the liquid cooling system; a solar tracking system; and a parabolic mirror concentrator, wherein the liquid cooling system comprises a closed circulation circuit having: a first circuit section having a passage located over surfaces of the panel with the bifacial PV cells for cooling the surfaces of the panel with the bifacial PV cells when a coolant passes therein; and a second circuit section located such that coolant passes through a focus of the parabolic mirror concentrator for additional heating of the coolant passing therein prior to entering the heat exchanger.

In accordance with at least one embodiment, the solar power installation may further comprise glass sheets, the glass sheets being interconnected by spacers through openings in the intermediate panel sections; spacer plates, the spacer plates being located on both sides of the panel between the glass sheets and the spacers; a coolant inlet being located at the lowest point of the PV module relative to the ground level, and a coolant output being located at the highest point of the PV module relative to the ground level.

In accordance with at least one embodiment, the coolant may be chosen such that a transmission spectrum of the coolant coincides with a photoactive part of the PV module absorption spectrum, and the transmission spectrum of the coolant being between 400 and 1200 nm.

In at least one embodiment, the solar power installation as disclosed herein comprises at least one bifacial PV module having a liquid cooling system, a flat mirror concentrator, a parabolic mirror concentrator, a heat exchanger with a system for circulating liquid in a loop, unidirectional valves, and a sun tracking system. The cooling system is a single circulation circuit, divided functionally into two sections. One part of the contour (a first circuit section) is the volume located inside the PV module above the surfaces of the panel with bifacial PV cells, bounded by transparent glass sheets. The second part of the contour (a second circuit section) passes through the focus of the parabolic mirror concentrator.

Thus, the functional purpose of the coolant in these sections will be different. In the first section in the volume of the PV module, the coolant flowing along the PV module from below upwards take heat away due to convection from the PV cells ensuring the temperature of PV cells within the operating limits— not higher than +85° C. Passing through the parabolic concentrator, the coolant is additionally heated and then flows into the heat exchanger. After the heat exchanger, the coolant is again fed via a circulation system to the PV module volume. To prevent the mutual influence of the fluid from different PV modules in the circulation circuit, unidirectional valves are installed at the output of each PV module.

In at least one embodiment, one part of the cooling circuit inside the PV module is a volume above the surfaces of a panel with bifacial PV cells bounded by transparent glass sheets, the glass sheets being interconnected by a number of spacers through openings in sections of the panel free of PV cells. Between the glass sheets and the panel, spacer plates are installed on both sides between the spacers to provide effective cooling of the PV cells by the coolant streams. The place of coolant input into the PV module is located at the lowest point, and the output is at the highest point of the PV module relative to the ground level.

In at least one embodiment, the transmission spectrum of the coolant coincides with the photoactive part of the PV module absorption spectrum and lies in the range from 400 to 1200 nm.

In at least one embodiment, the solar power installation comprises at least one bifacial PV module with a liquid cooling system, a flat mirror concentrator, unidirectional valves— characterized in that it contains an aluminum frame for circulating the cooling fluid over the PV module; containing a cavity inside the profile of the frame, and the cavity is connected to the outlet channel in the upper part of the PV module, so that the cooling liquid enters the frame from the surface of the PV module panels, the cavity is also connected through the input channel to the lower part of the PV module; at it the distance between the input and output channels must be at least 0.5 m relative to the ground level, and the frame is designed to allow maximum heat exchange with the environment in areas where the profile of the frame is cooled by the coolant.

In accordance with another broad aspect of the present technology, there is provided a solar power plant comprising: at least one bifacial photovoltaic (PV) module each having: a liquid cooling system including unidirectional valves; a flat mirror concentrator; PV cells; and a frame for circulating a cooling fluid along the bifacial PV module, the frame comprising: a cavity within a body of the frame, the cavity being connected to an output channel in the upper portion of the PV module, so that the cooling liquid enters the frame from surfaces of the PV cells, the cavity being connected through the input channel to the lower portion of the PV module, a distance between the input and output channels being at least 0.5 m when calculated relative to the ground level.

In some embodiments of the present technology, the frame is executed such as to maximize heat exchange with an outside environment in sections where the coolant passes through the profile of the frame.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

FIG. 4A is a front view of the PV module operating in a standalone mode in accordance with at least one embodiment.

FIG. 4B is a sectional view of the PV module operating in the standalone mode in accordance with at least one embodiment.

DETAILED DESCRIPTION OF THE NON-LIMITING EMBODIMENTS

Figure 1:
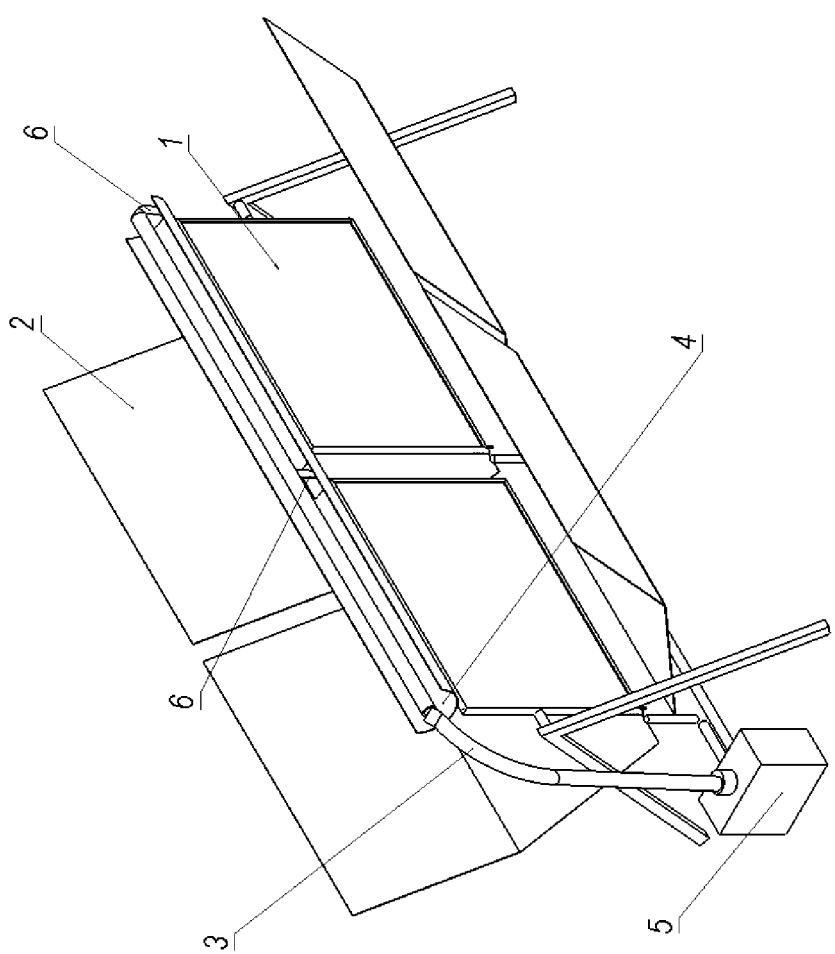
FIG. 1 is an isometric view of an SPI in accordance with at least one embodiment.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future.

To solve the above mentioned problem(s), a solar power installation is disclosed herein. The solar power installation comprises at least one bifacial PV module with a liquid cooling system, a flat mirror concentrator, a parabolic mirror concentrator, a heat exchanger with a fluid circulation system in the circuit, unidirectional valves, and a solar tracking system.

The cooling system is a single circulation circuit, divided functionally into two sections. One part of the contour (a first circuit section) is the volume located inside the PV module above the surfaces of the panel with bifacial PV cells, bounded by transparent glass sheets. The second part of the contour (a second circuit section) passes through the focus of the parabolic mirror concentrator. Thus, the functional purpose of the coolant in these areas is different.

In the first section, in the volume of the PV module, the coolant flowing along the PV module from below upwards take heat away due to convection from the PV cells ensuring the temperature of PV cells within the operating limits— not higher than +85° C. Passing through the parabolic concentrator, the coolant is additionally heated and then flows into the heat exchanger. After the heat exchanger, the coolant is again fed via a circulation system to the PV module volume. To prevent the mutual influence of the fluid from different PV modules in the circulation circuit, unidirectional valves are installed at the output of each PV module.

Such construction of the SPI may allow increasing the efficiency of obtaining solar electrical and thermal energy:

(1) In this SPI, the bifacial PV modules can have significant dimensions and a high specific peak power, more than 450 W/m2 even at high ambient temperatures.

(2) The second parabolic mirror concentrator monitors the sun with the help of the same system that monitors the sun for the PV module and does not require additional costs to organize this tracking.

The SPI monitors the position of the sun in the polar coordinate system.

Figure 2:
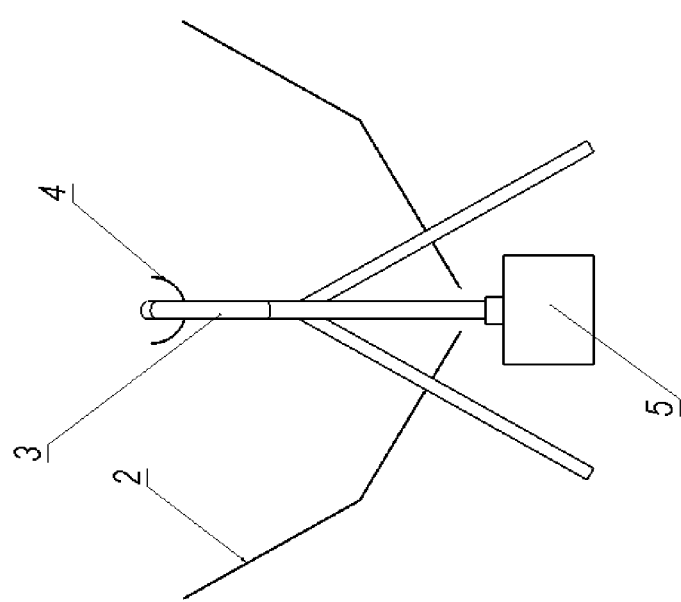
FIG. 2 is a side view of the SPI in accordance with at least one embodiment.
Figures 3A, 3B:
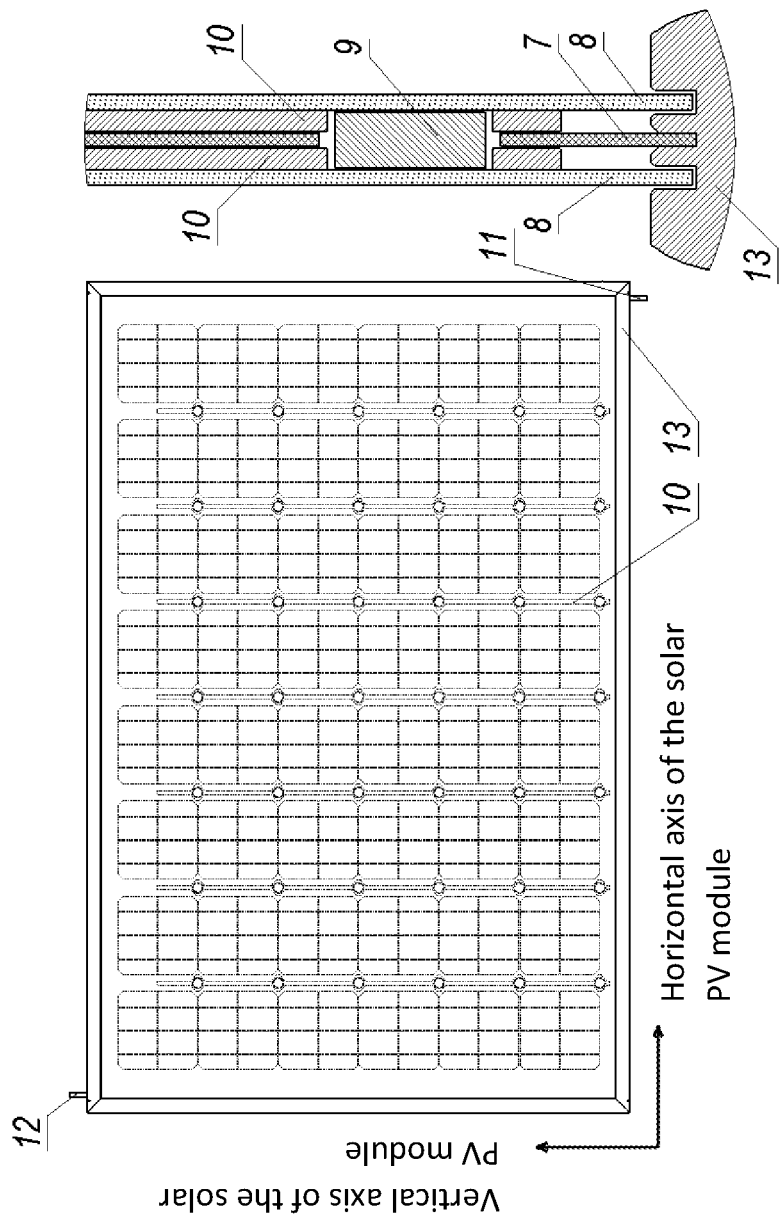
FIG. 3A is a front view of the PV module in accordance with at least one embodiment.
FIG. 3B is a sectional view of the PV module in accordance with at least one embodiment.

Referring to FIGS. 1 and 2, in accordance with the non-limiting embodiments of the present technology, the SPI consists of at least one bifacial liquid-cooled PV module 1, on both sides of which symmetrically solar energy is supplied from a concentrator of flat mirrors 2. The heated coolant coming out of the PV module enters the pipeline 3, part of which is in the focus of a parabolic mirror concentrator 4, located above the PV modules, in which the coolant is additionally heated by solar energy. The coolant then enters the heat exchanger with a fluid circulation system 5, where the coolant cools, giving off heat, and returns to the PV modules. In the pipeline 3, at the output of each PV module, unidirectional valves 6 are installed to prevent the mutual influence of the fluid from different PV modules.

Referring now to FIGS. 3A, 3B, 4A and 4B, in at least one non-limiting embodiment, the installation includes a panel 7 of at least two thin transparent films 17 protecting a bifacial PV cells from the negative effect of the coolant is located in the center of the volume of the PV module filled with the coolant. The volume of the PV module is limited by two thin glass sheets 8.

In some non-limiting embodiments of the present technology, to compensate the fluid pressure and to ensure the geometric dimensions of the PV module, the glass sheets 8 are interconnected by the spacers 9 through the holes (also referred to herein as "openings") in the panel sections free of PV cells (also referred to herein as "intermediate panel sections"). Between the glass sheets 8 and the panel 7, and between the spacers 9, spacer plates 10 are installed on both sides of the panel 7 to effectively cool the PV cells.

A coolant input for the PV module can be located at a lowest point, and an output can be located at a highest point of the PV module relative to the ground level and made in the form of fittings depicted at 11 and 12.

In at least one embodiment, the installation may have a transmission spectrum of the coolant coinciding with the photoactive part of the PV module absorption spectrum. For example, such spectrum may be in the range from 400 to 1200 nm.

Referring now to FIGS. 4A and 4B, in at least one embodiment, the SPI may operate in a standalone mode of cooling the PV module without extracting and using heat. In this embodiment, the parabolic concentrator and the heat exchanger with a fluid circulation system are excluded from the structure of the SPI. PV module for such SPI is characterized by the fact that a cavity 16 is formed in the aluminum frame 13 of the PCM, forming a closed hermetic circulation circuit with the volume of the PV module between the glasses, for the movement of the coolant in it under the action of gravitational forces.

In this embodiment, the shape and the area of the frame may be selected such that the liquid entering the cavity through the channel 14 at the upper point of the PV module has sufficient time to cool in the aluminum frame and enter the volume of the PV module through a similar channel at the lower point of the PV module with a temperature that does not allow the flexible panel with bifacial PV cells to be heated above the maximum permissible operating temperature.

In some embodiments of the present technology, the PV module (for example, as depicted in FIG. 4B) is implemented such that there are no inlet and outlet fittings of the coolant in the frame. Within these embodiments, an expansion tank 15 can be installed instead of the coolant outlet fitting, which is necessary to compensate for changes in the volume of the liquid as a result of the heating-cooling cycles. A cavity 16 is formed in the frame of the PV module 13, into which the liquid enters through the channel 14 at the upper and lower points of the PV module in the frame. The channel area may be chosen based on the velocity of the fluid in the PV module.

It should be expressly understood that not all technical effects mentioned herein need to be enjoyed in each and every implementation of the present technology. For example, implementations of the present technology may be implemented without the user enjoying some of these technical effects, while other implementations may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A solar power apparatus comprising:
   a bifacial photovoltaic (PV) module having:

a liquid cooling system including non-return valves, and
a panel including:
bifacial PV cells, and
intermediate panel sections;
a flat mirror concentrator for concentrating light on the panel;
a heat exchanger with a fluid circulation system in fluid communication with the liquid cooling system;
a solar tracking system; and
a parabolic mirror concentrator,
the liquid cooling system further comprising a closed circulation circuit having:
a first circuit section having a passage located over surfaces of the panel with the bifacial PV cells for cooling the surfaces of the panel with the bifacial PV cells when a coolant passes through the passage for cooling the bifacial PV cells; and
a second circuit section located such that the coolant passes through a focus of the parabolic mirror concentrator for additional heating of the coolant prior to entering the heat exchanger.

2. The solar power apparatus according to claim 1, wherein the solar power apparatus further comprises:
glass sheets, the glass sheets being interconnected by spacers through openings in the intermediate panel sections;
spacer plates, the spacer plates being located on both sides of the panel between the glass sheets and the spacers;
a coolant inlet being located at the lowest point of the PV module relative to the ground level, and
a coolant output being located at the highest point of the PV module relative to the ground level.

3. The solar power apparatus according to claim 1, wherein:
the coolant is chosen such that a transmission spectrum of the coolant coincides with a photoactive part of the PV module absorption spectrum, and
the transmission spectrum of the coolant being between 400 and 1200 nm.

4. The solar power apparatus according to claim 2, wherein:
the coolant is chosen such that a transmission spectrum of the coolant coincides with a photoactive part of the PV module absorption spectrum, and
the transmission spectrum of the coolant is in the range of 400 to 1200 nm.

\* \* \* \* \*